United States Patent [19]
Ziegler et al.

[11] Patent Number: 5,855,308
[45] Date of Patent: Jan. 5, 1999

[54] COIN HOLDER FOR MOTOR VEHICLES

[75] Inventors: Christiane Ziegler, Waldachtal; Rüdiger Widulle, München; Carsten Lange, Wolnzach, all of Germany

[73] Assignee: Fischerwerke, Artur Fischer GmbH & Co. KG, Waldachtal, Germany

[21] Appl. No.: 873,418

[22] Filed: Jun. 12, 1997

[30] Foreign Application Priority Data

Jun. 14, 1996 [DE] Germany .................. 296 10 478.7

[51] Int. Cl.⁶ ..................................................... B60R 7/00
[52] U.S. Cl. ........................................... 224/281; 224/282
[58] Field of Search .................................. 224/281, 282; 453/46, 49, 57, 39, 42, 43

[56] References Cited

U.S. PATENT DOCUMENTS

| | | |
|---|---|---|
| 2,896,892 | 7/1959 | Berardinelli . |
| 5,024,629 | 6/1991 | Murray . |
| 5,449,105 | 9/1995 | Schiff et al. . |

FOREIGN PATENT DOCUMENTS 79 12 585  4/1979  Germany .

*Primary Examiner*—David J. Walczak
*Attorney, Agent, or Firm*—Michael J. Striker

[57] ABSTRACT

A coin holder for motor vehicles has a housing which can be inserted into a control panel and a receptacle element for a plurality of coins. The receptacle element is rotatable by a rotation bearing about a horizontal axis of rotation out of the housing of the coin holder from a storage position to a removal position. So that the receptacle element in the removal position can yield resiliently if it is touched unintentionally or if the middle armrest is lowered onto it, the receptacle element is arranged in the housing to be additionally resiliently displaceable linearly.

2 Claims, 3 Drawing Sheets

COIN HOLDER FOR MOTOR VEHICLES

BACKGROUND OF THE INVENTION

The invention relates to a coin holder for motor vehicles.

Coin holders of the above mentioned general type are known in the art. In one of the known coin holders disclosed in U.S. Pat. No. 5,449,105 a receptacle element for a plurality of coins is provided, which receptacle element can be inserted vertically int the housing of the coin holder. The coin holder can be arranged, for example, in the control panel of a motor vehicle. The receptacle element is unlocked by pressing it and is removed linearly upwards into a removal position by a spring. By pressing the receptacle element down, the latter can be displaced back into the storage position against the spring force. As a result of the large height of travel that must be covered in the displacement to the removal position, the total installation depth for that known coin holder is relatively large.

SUMMARY OF THE INVENTION

Accordingly, it is an object of present invention to provide a coin holder for motor vehicles that, in the removal position, projects only a little way out of a control panel and is simple to operate.

In keeping with these objects and with others which will become apparent hereinafter, one feature of present invention resides, briefly stated, in a coil holder in which the receptacle element is rotatable by a rotation bearing about a horizontal axis of rotation out of the housing of the coin holder from the storage position to the removed position, and the receptacle element is arranged in the housing to be resiliently displaceable linearly.

When the coin holder is designed in accordance with the present invention, it solves the above mentioned problems. The receptacle element that receives the coins to be store is mounted in the housing of the coin holder about a horizontal axis of rotation in such a manner that it can be rotated easily out of the housing into a removal position. Moreover, so that the coin holder can be positioned without difficulty in the control panel of a motor vehicle, the rotatable receptacle element is mounted in the housing of the coin holder so as to be linearly displaceable. That has the advantage that the receptacle element in the removal position can yield resiliently if it is touched unintentionally or if the middle armrest is swivelled down onto it, the receptacle element being thereby largely safe from damage.

The receptacle element is preferably in the form of a semi-cylindrical part having a plurality of side receiving openings for coins. The individual coins can be held in the same manner as in traditional and generally known coin holders.

The accommodating space for the receptacle element may be adapted to the shape of the receptacle element; accordingly, in the case of a semi-cylindrical receptacle element that accommodating space may also be semi-cylindrical.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE DRAWINGS

Figure 1:
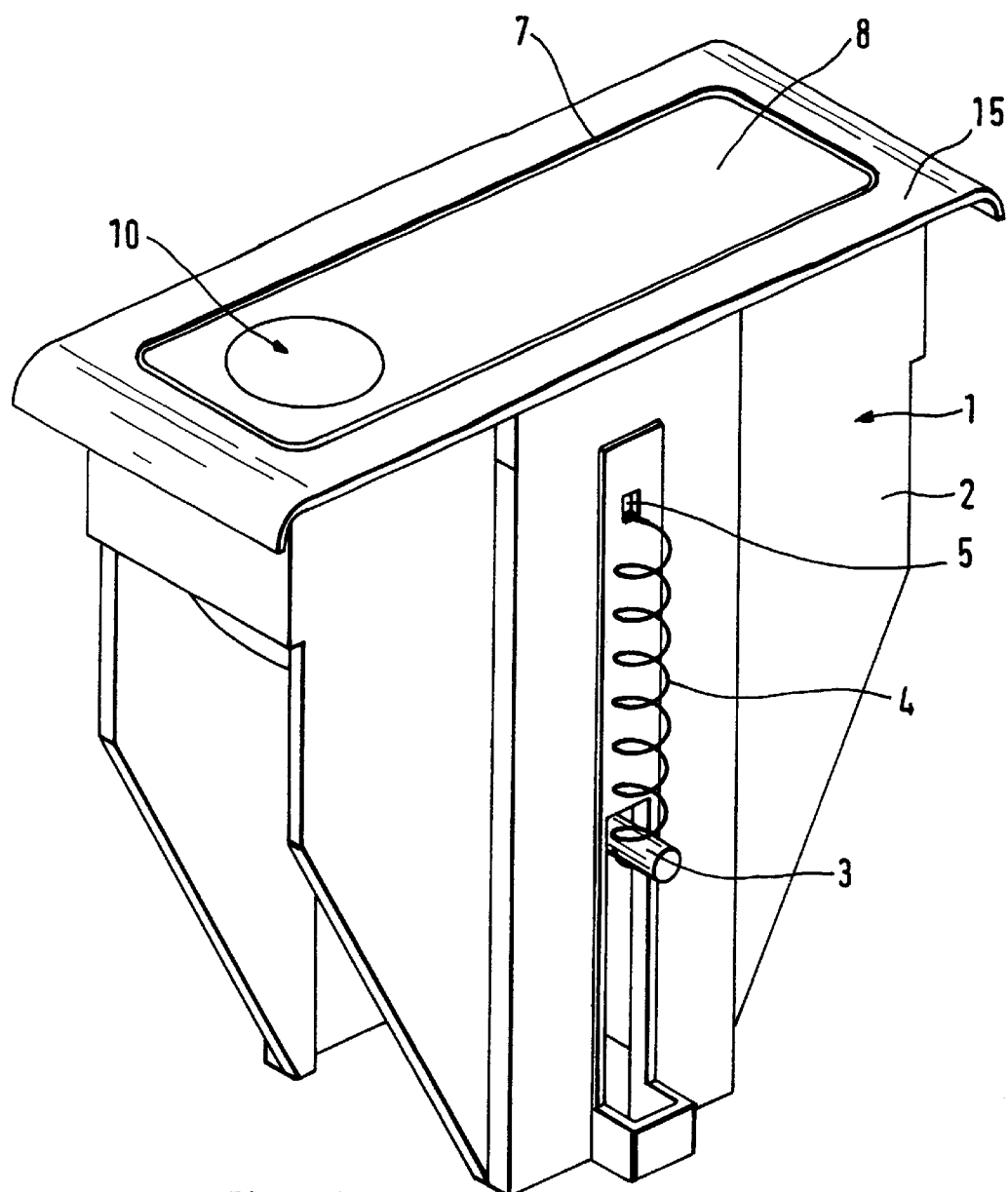
FIG. 1 shows a coin holder having a receptacle element for coins, the receptacle element being in the storage position.

A coin holder 1 shown in FIG. 1 has a housing 2 inside which there is inserted a linearly displaceable slider element 3. The slider element is linearly displaceable to a lower position 6, shown in FIG. 3, against the force of a helical spring arranged as a tension spring 4 which is fixed at its upper end to an opening 5 of the housing 2.

Figure 2:
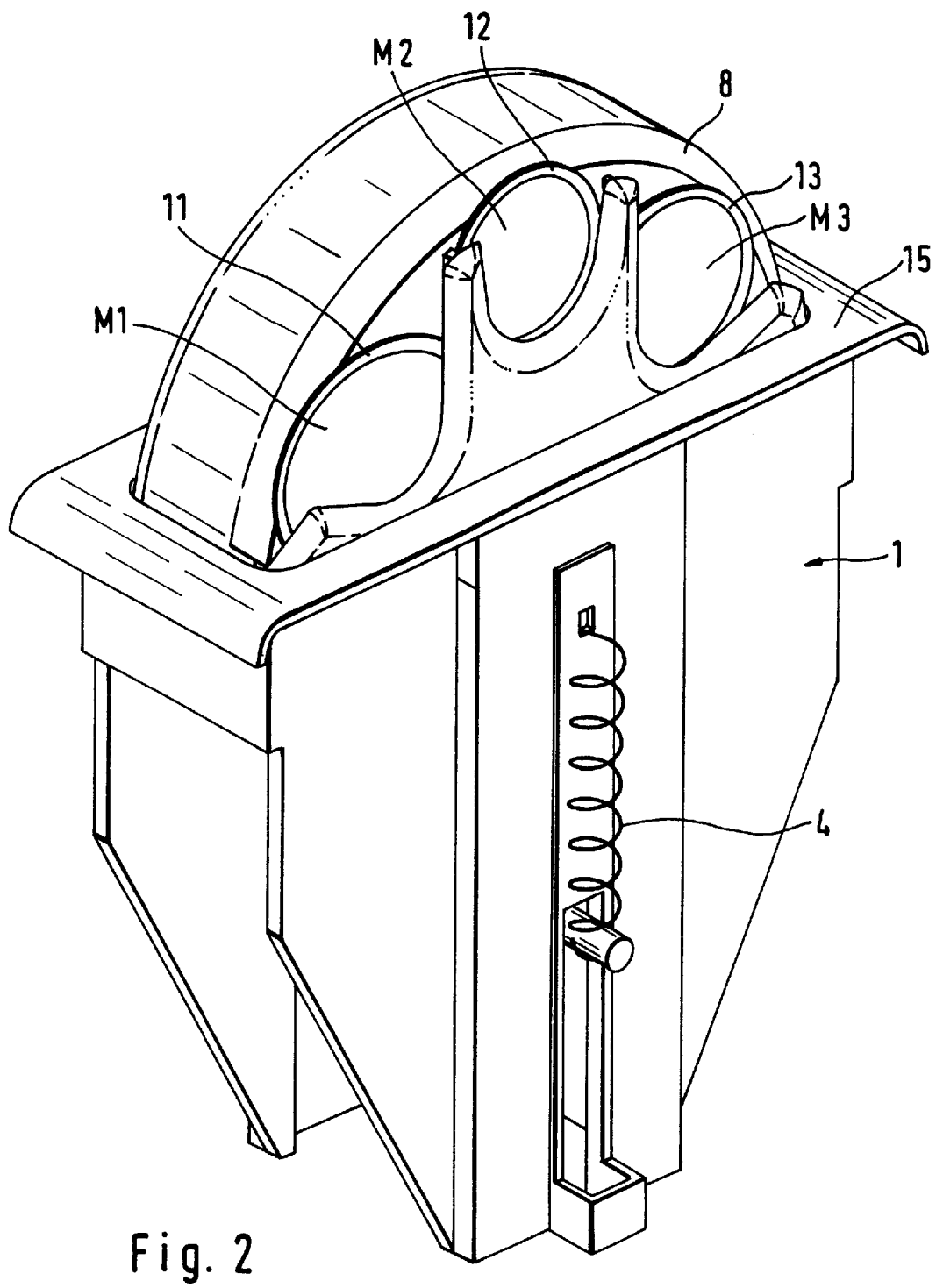
FIG. 2 shows the coin holder of FIG. 1 with the receptacle element in removal position.
Figure 3:
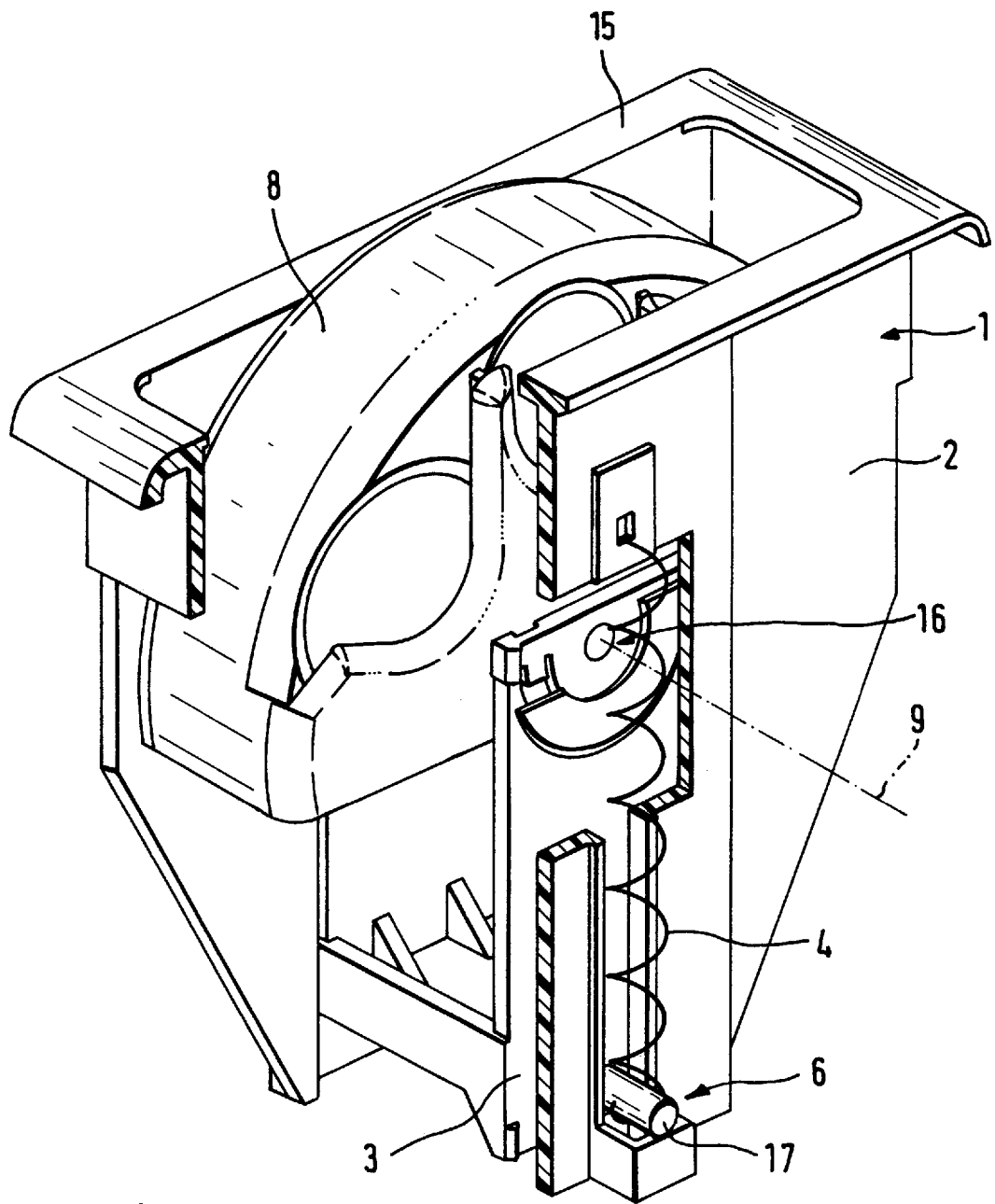
FIG. 3 shows the coin holder of FIG. 2 with the receptacle element pressed resiliently downwards.

At the top of the housing 2 there is an opening 7, inside which there is inserted a receptacle element 8 which is rotatable about an axis 9 of rotation, shown in FIG. 3. In FIG. 1, the receptacle element 8 is in the storage position, from which it can be rotated into the removal position shown in FIG. 2, by pressure from above, for example, in the region 10.

The receptacle element 8, which is in the removal position in FIG. 2, is intended for receiving a plurality of coins M1 to M3, a plurality of identically sized coins being held one on top of the other in each of the corresponding receiving openings 11 to 13. The coins M1 to M3 can be removed easily to the side with the thumb. Conversely, coins can also be inserted into the receiving openings 11 to 13 from the side, as is the case in coin holders known per se. After the removal or insertion of coins, the approximately semi-cylindrical receptacle element 8 can be rotated again by 180° into the storage position shown in FIG. 1.

The coin holder installed in a control panel (not shown) of a motor vehicle lies virtually completely inside the control panel, with the result that only the frame 15 surrounding the receptacle element 8 and the receptacle element 8 are visible from above. The rotation bearing 16, seen in FIG. 3, which enables the rotation of the receptacle element 8, is inside the housing 2 and so also inside the control panel in which the coin holder is installed. The rotation bearing 16, together with the receptacle element 8, is linearly displaceable against the force of the tension spring 4 vertically from the removal position shown in FIG. 2 to the lowered position shown in FIG. 3. In FIG. 3, the slider element 3, on which the rotation bearing 16 is arranged, and its guide pins 17 are in the lowermost end position. That linear displacement to the end position shown in FIG. 3 can be effected by a vertical pressure on the receptacle element 8 from above.

It will be understood that each of the elements described above, or two or more together, may also find a useful application in other types of constructions differing from the types described above.

While the invention has been illustrated and described as embodied in coin holder for motor vehicles, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A coin holder for motor vehicles, comprising a housing insertable into a control panel; a receptacle element for a plurality of coils, said receptacle element being movable between a storage position and a removal position; a spring arranged so that said receptacle element being insertable linearly into the control panel against a force of said spring; a rotation bearing arranged to support said receptacle so that said receptacle is rotatable about a horizontal axis of rotation out of said housing from the storage position to the removal position, said receptacle element being arranged in said housing to be resiliently displaceable linearly, said receptacle element being a substantially semi-cylindrical part having a plurality of side receiving openings for coins.

2. A coin holder as defined in claim 1; and further comprising a slider element on which said rotation bearing is arranged.

* * * * *